United States Patent [19]

Baker et al.

[11] Patent Number: 5,517,587
[45] Date of Patent: May 14, 1996

[54] POSITIONING METHOD AND APPARATUS FOR LINE SCANNED IMAGES

[75] Inventors: Robert G. Baker; Paul R. Swingle, both of Delray Beach, Fla.

[73] Assignee: International Business Machines Corporation, Armonk, N.Y.

[21] Appl. No.: 311,472

[22] Filed: Sep. 23, 1994

[51] Int. Cl.$^6$ .................................................. G06K 9/32
[52] U.S. Cl. ................... 382/296; 382/278; 364/709.04; 235/462; 358/444
[58] Field of Search .................. 382/46, 42; 364/709.04; 235/462; 358/444

[56] References Cited

U.S. PATENT DOCUMENTS

| | | | |
|---|---|---|---|
| 3,831,146 | 8/1974 | Rundle | 340/146.3 H |
| 4,338,588 | 7/1982 | Chevillat | 340/146.3 H |
| 4,558,461 | 12/1985 | Schlang | 382/9 |
| 4,723,297 | 2/1988 | Postl | 382/46 |
| 5,001,766 | 3/1991 | Baird | 382/46 |
| 5,027,227 | 6/1991 | Kita | 358/488 |
| 5,050,225 | 9/1991 | Itoh | 382/46 |
| 5,054,098 | 10/1991 | Lee | 382/46 |
| 5,093,653 | 3/1992 | Ikehira | 340/727 |
| 5,233,168 | 8/1993 | Kulik | 382/46 |
| 5,410,417 | 4/1995 | Kuznicki et al. | 382/46 |

FOREIGN PATENT DOCUMENTS

433645A2  9/1990  European Pat. Off. ........ G06F 15/62

*Primary Examiner*—Jose L. Couso
*Assistant Examiner*—Anh Hong Do
*Attorney, Agent, or Firm*—Anthony N. Magistrale; Daniel E. McConnell

[57] ABSTRACT

A method and computer implementation are disclosed for correcting skew and shift which may occur as the image on a document or other field is scanned with line scanning apparatus. By selecting scans, lines are logically overlaid upon a memory map of the scanned image and a best-fit line is calculated through left-most image points near the left ends of the lines. The best-fit line substantially defines the left margin. The angle which complements the angle between the overlay lines and the best-fit line is calculated and the image map is rotated in storage, aligning the image with scanner's x-axis and y-axis. The method may be started while scanning is still in progress and the last portion of the image may be rotated according to the invention as it is being stored. The left margin is more accurately found by expanding the search for left-most pixels using search areas around the fit originally found left-most points. The best-fit line is further refined by calculating a standard deviation of each left-most point from the best-fit line and taking a new best-fit line through those points that deviate by less than for example two sigma from the original best-fit line.

22 Claims, 5 Drawing Sheets

POSITIONING METHOD AND APPARATUS FOR LINE SCANNED IMAGES

BACKGROUND OF THE INVENTION

This invention relates to the detection and correction of skew and shift in images scanned into a system by an optical line scanning device.

The use of optical line scanners to enter an image into a system such as a facsimile machine or copy machine as well as a character recognition machine is well established. In some systems, the document to be entered is placed on a flat surface and is either scanned in place by optical and mechanical means or is fed through the machine by rollers. In all of these systems, there is the probability that the document will by placed or fed through the machine at an offset position and/or a skew angle. The result is that pages of copy or facsimile come out of the system looking tilted, which may make them distracting to read by a person or difficult to read by a computer or other mechanized analysis.

Rundle, U.S. Pat. No. 3,831,146 teaches pre-scanning hand written characters which are often written at a slant to the right from the vertical. The pre-scan uses scan lines at 60, 70 and 90 degrees from the horizontal. Each time that a character is scanned, special combinatorial logic operates on the stored character and develops a count of the number of predominant line segments found at that angle. The angle having the greatest number of predominant line segments is chosen as the recognition scan angle. This system does not work for images that do not have a significant number of vertical line components in the character set or for other images of non text documents.

Chevillat, U.S. Pat. No. 4,338,588 teaches a mechanical method for rotating, relative to a document, optical transducer apparatus having a plurality of parallel elongated light transducers. Signals accumulated from the transducers reach a distinct maximum when the transducers have been rotated so that the elongation of the transducers are in line with the printed lines on the document. This has the shortcomings of mechanical systems which include wear, unreliability, and low speeds.

Schlang, U.S. Pat. No. 4,558,461 teaches the formation of logical swaths vertically through image data and creates a list of data intersections with the swaths. Using these intersections, blocks of text are detected. All points in a block are set to black and then used to distinguish lines from which skew angles are derived by the method of linear regression.

The Schlang method is complex and manipulates the data after it has been stored in memory which adds to system costs and processing time.

Postl, U.S. Pat. No. 4,723,297 teaches the use of a sequence of systematically selected search angles which are either simulated or calculated using Fourier analysis. A critical precondition for successful operation with the Postl method is a significant content of horizontal or vertical members in the text source material on the document, which means that non-text images are not acceptable.

Baird, U.S. Pat. No. 5,001,766 discloses a method which locates characters by finding the lower right point of the character and then running "bin counts" at a series of skew angles by adding up the dots for each angle. The largest value determines the angle of document orientation or skew. The skew angles are imaginary lines onto which the image is projected by mechanically rotating the projection device. Further, the use of the lower right point of a character depends on a bottom or down reference which must be predefined.

The document is then mechanically reoriented to correct the skew. The use of mechanical projection adversely affects reliability and the creation of the down reference is a time consuming manual step.

Kita, U.S. Pat. No. 5,027,227 rotates blocks or subsections of images in parallel and then relies on manual operator input to determine skew angle. Blocks of image are then moved which can result in disjointed lines being produced by the rotation.

Lee, U.S. Pat. No. 5,054,098 teaches the creation of polygons by tracing the contour of individual objects which have been detected by horizontal scans. Large polygons are then created and selected to determine line angle. A modified Hough transform is used to detect straight lines from which the skew angle is detected. The skew is then corrected by matrix operation.

These methods are time consuming and require extensive computation overhead.

Ikehira U.S. Pat. No. 5,093,653 teaches a manual method where the operator selects a point and then visually creates a reference line from which the system calculates the skew angle and rotates the image.

Itoh U.S. Pat. No. 5,050,225 describes a method for rotating an existing bit map though various angles using shear rotation. The skew angle is not detected but is assumed to be already known.

SUMMARY OF THE INVENTION

The problems of complexity, cost, low speed, image distortion and limited application in the prior art are much reduced by the use of the instant invention which employs the two stages of skew angle detection and skew correction organized into a synergistic process with document or other image field scanning. The skew angle is automatically detected without the need for an external reference line while the first part of the image field is being scanned. This allows the remainder of the image to be rotated as it is being scanned, which results in the savings of storage space and memory operations and improves overall processing speed.

Our method assumes only one image characteristic and that is the existence of a relatively straight left hand side which is the characteristic of most English text and bordered images. The technique would work equally well in analogous fashion for written languages that are "right to left" (like Hebrew). Our method and apparatus establishes the left hand edge of a body of text or an image by finding the left-most point in periodic samples of horizontal scans. We compensate for the spaces between lines of text by expanding the identified points, sweeping a hypothetical area such as a circle around the points, and then re-selecting the left-most point in the sweep. A best-fit line is then established through these left-most points to detect the skew angle of the image. After detecting the angle using a subregion of the whole image, the image is rotated using shear rotation calculations while the remainder of the image is scanned. Thereafter, the position of the image may be corrected by either centering the image or providing for a predetermined top and left margin.

Accordingly it is an advantage of the invention that it can operate automatically on nearly all kinds of images without the need for a predetermined or manually constructed reference line in or near the image.

it is a further advantage of the invention that it can determine the angle of skew of an image without requiring that the image have a significant number of horizontal or vertical members.

It is a still further advantage of the invention that a minimum number of relatively simple calculations need be performed on only a portion of the image points or picture elements so that storage and computation resources are conserved and the speed of operation of the system is enhanced.

DESCRIPTION OF THE PREFERRED EMBODIMENT(S)

Figure 1:
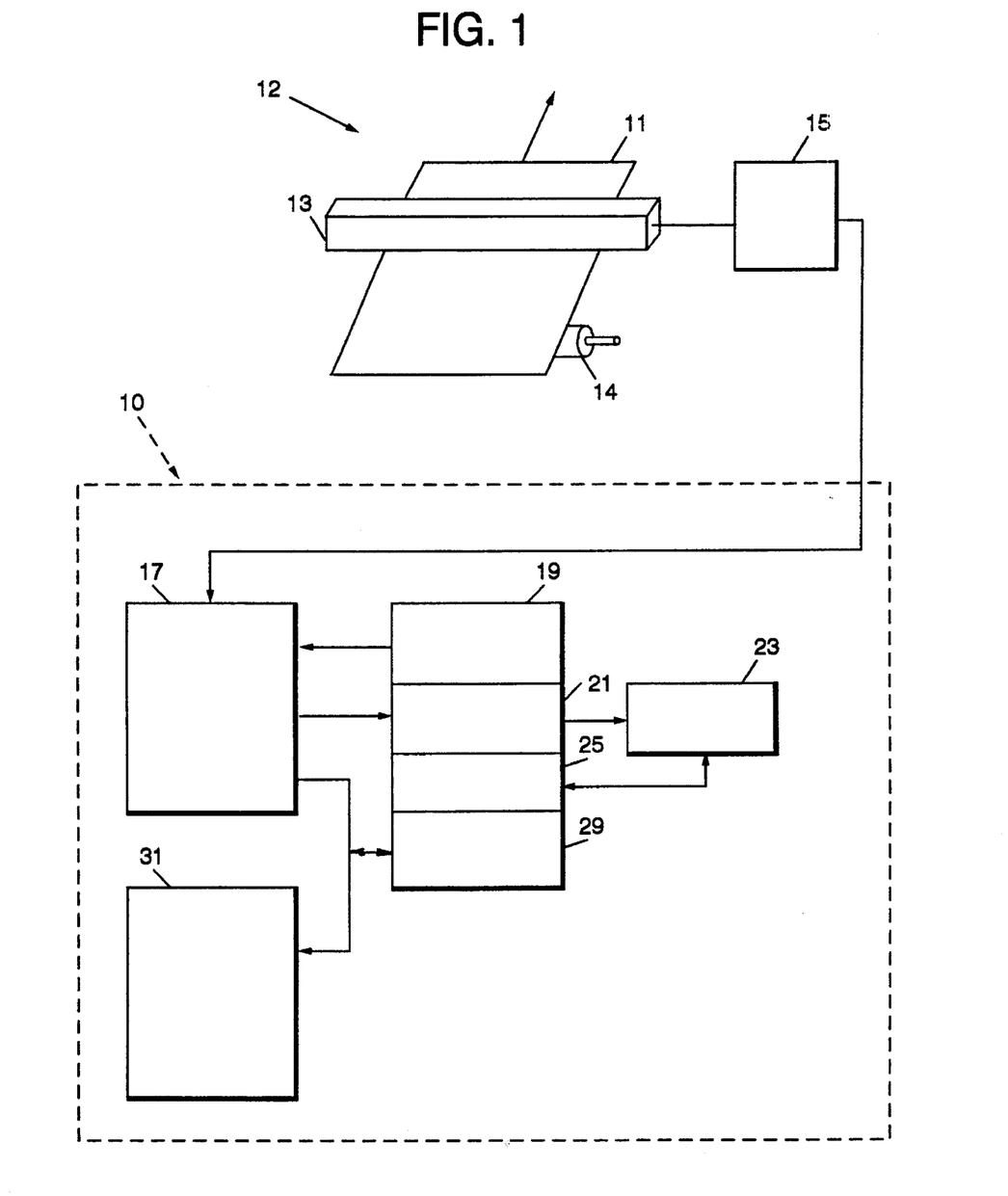
FIG. 1 shows a block diagram of a system implemented according to the invention.

FIG. 1 shows a computer 10 connected to a document scanner 12 according to the invention. Computer 10 has in its memory, programmed instructions for performing the steps of the method of the invention. The programmed instructions identify a number of the storage locations of the memory as data buffers for storing incoming image data and intermediate results as well as the final rotated and shifted image.

The scanner 12 shown in FIG. 1 comprises a conventional document transport, shown as roller 14. Examples of such document transports are well known and therefore the details will not be shown to avoid needlessly complicating the description. Roller 14 transports the document 11 under a line scanning head 13. Other forms of image capture mechanisms such as an optical field sensor and a lens can be utilized in place of a document transport and line scanner. Scanning head 13 preferably contains an array of charge coupled devices (CCDs) which respond to light reflected from document 11. The CCDs are clocked to shift the detected light information out of the scanning head 13 to analog amplifier and contrast circuits 15 which digitize the light information into binary light and dark picture elements (pixels) or, in more sophisticated systems, into digital words representing grey scale pixels. The spacing of the CCDs in the array and the number of times that the array is shifted out relative to document transport speed determines the scanning resolution. For character recognition using algorithms of today's art, a resolution of 500 pixels per inch of scan line and 500 scan lines per vertical inch of document travel provides reliable recognition. In image processing applications a lesser or greater resolution may be desired depending upon the purpose of the image processing.

The circuits of 15 may be mounted in the scanner 12 or they may be on an adapter card which is mounted in the computer 10. The circuits 15 are connected to the computer memory for storing the digitized image pixels into image buffer 17 shown in FIG. 1. The pixels are stored either as a matrix with the storage locations corresponding to the pixel locations in the image or they are stored using some coded method where a record of the locations of each pixel of each scan in the image is preserved.

The image on document 11 may comprise text and/or pictorial image and this image is scanned at a relatively high resolution rate as described above in order to have sufficient information for subsequent text recognition or other image processing. For purposes of skew angle determination, such high image resolution is not needed and therefore a scan selection and address control logic 19 is provided as programmed computer instructions in the computer memory. Logic 19 controls the computer memory to select from buffer 17 those pixels that were scanned for example at a rate of one hundred horizontal lines per inch. This is accomplished by processing only every fifth scan for skew detection. Even this reduced number of scan lines will make the explanatory drawings unduly complex and therefore, for purposes of the drawings only, a rate of ten scan lines per inch will be used to show the skew determination method of the instant invention, but the explanation will be in terms of the preferred embodiment which is one hundred lines per inch.

To avoid operating upon misleading image information from the top of a non-text image or first line of text, the skew determination method starts its process at an address in the buffer 17 that approximates about one half inch down from the top of the image. Therefore logic 19 begins selecting pixels that were provided after the first two hundred and fifty image scans of scanner 12 when scanning at 500 lines per inch.

Assuming that the document 11 has dark characters or pictorial image on a light background, pixel selection control logic 21 is logically connected to logic 19 and to buffer 17 to select the left-most non-white pixels in the vicinity of each fifth scan line resulting in a skew detection process which uses one hundred scan lines per inch. An x-coordinate value is recorded in a list in buffer 23 by pixel selection logic 21 representing the location of the left-most pixel in the image in the vicinity of the selected left to right scan line where the first non-white pixel occurred. Logic 21 performs the above described left-most pixel selection for each selected scan line in one of a number of ways, some of which are described later, and stores the coordinates of the selected pixels in buffer 23.

Best-fit logic 25 is logically connected to the pixel selection logic 21 and to left-most pixel buffer 23. Logic 25 comprises computer instructions for mathematically constructing a line through the selected left-most pixels. Alternatively, this function can also be performed by standard or custom integrated circuits. The best-fit line will contain between two hundred and three hundred points when skew correction lines are chosen at approximately 100 per inch. The best-fit line represents the left-most pixels, most of which will be very near to the actual left hand margin. The output of best-fit logic 25 is an angle from the vertical which is directly related to the slope of the best-fit line.

Shear rotation and image shift logic 29 is logically connected to best-fit logic 25 and buffers 17 and 31. Shear rotation logic 29 receives from logic 25, the angle from vertical. Shear rotation logic 29 uses the received angle to rotate the pixels stored in buffer 17 and places the rotated resultant image into the main image buffer 31 from which it is available for recognition or further image processing. The image is rotated clockwise when the angle is negative and it is rotated counter clockwise when the angle is positive. The image can also be shifted by logic 29 to obtain a predefined left margin without losing data from the right side of the image.

By determining the amount of skew while the scan information is being stored in buffer 17 and calculating skew in a time share process, rotation can begin after about half of the document has been scanned. By using this feature of the invention, rotation will usually be substantially completed when document scanning is complete.

Operation of a preferred embodiment

Figure 2:
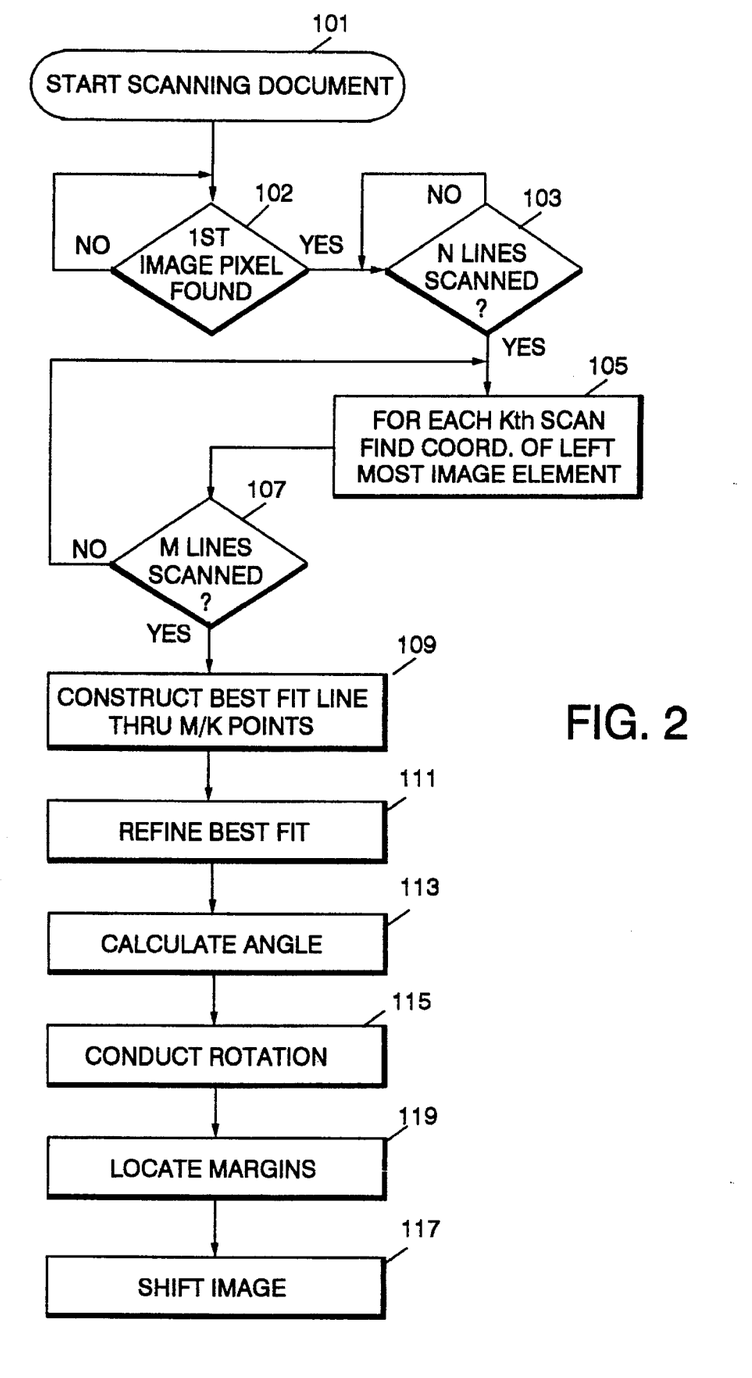
FIG. 2 is a flow diagram showing the method of the invention.

Referring now to FIG. 2, the flow diagram shown therein will be used to describe the method of operation of the preferred embodiment.

The method of the invention starts with the line scanning of the document 11 by scanner 12 at block 1 01. The number of scans completed are counted as they are scanned to obtain a measure of the top margin. When the first image pixel is found at block 102, a new count is started to allow the process of the method to keep track of its place in the image data. The first n scans of image information are stored in buffer 17 for later rotation after the angle of required rotation has been determined. When scanning at a rate of approximately five hundred lines per inch, a value of n equal to two hundred fifty is a reasonable tradeoff between delaying skew detection too long while an image is being scanned and the possibility of introducing distortion. These n scans are stored in buffer 17 for later rotation but they are not used for skew detection to avoid distortion caused by encountering the top of an image skewed counter clockwise and mistaking it for the left margin skewed clockwise.

After n lines are scanned at 103, the flow of the method moves to block 105 where the amount of scan information selected on subsequent scans for skew detection is reduced in order to simplify later best-fit calculations. The reduction is accomplished by only saving the left-most pixel location of each kth scan out of the full five hundred per inch collected. In our preferred embodiment, k is five. By selecting the data in buffer 17 from each fifth image scan, the process has effectively overlaid the image data with horizontal lines which are spaced five times as far apart as the original scan lines. In this way, the left boundary of the image can be located without processing best-fit calculations on the left-most pixel of each original image scan line.

Approximately two hundred to three hundred left-most locations are stored in buffer 23 while the scanner 12 provides the information in image scan lines n through m for storage in buffer 17. Block 107 determines when m scans have been completed. The value of m may be chosen empirically depending upon the image being scanned. For 10 point text, a value of m in the range of twelve hundred fifty to seventeen hundred fifty will be appropriate. These scan lines will cover about two to three inches of the image.

After m scans, the method moves to block 109 where a best-fit line through the left-most locations is calculated by best-fit logic 25 embodied in the computer memory as a programmed routine. Depending upon the method used to collect the left-most points, it may be desirable to refine the best-fit at block 111. This may be accomplished by calculating the standard deviation of each left-most pixel location from the best-fit line. Those locations with deviations greater than, for example, 2 sigma are then discarded and a new best-fit line is calculated using the remaining left-most pixel locations. The angle of the new best-fit line will be substantially equal to the angle of the left margin of the image, and the slope of the best-fit line is directly related to the skew angle.

After the best-fit line has been found, the method moves to block 113 where the angle between the best-fit line and a line normal to the direction of scanning is calculated from the slope of the best-fit line. This angle is the angle by which the image is skewed.

At block 115, the programmed rotation process step is performed, preferably using three-shear rotation because this process does not require multiplication and is therefore easy to compute.

The method of three-shear rotation shown in U.S. Pat. No. 5,050,225 of common assignment herewith is the preferred embodiment of the rotation process step 115. The center point of rotation is preferably a point near the top of the image and lying on the best-fit line.

Block 117 depicts image shifting after rotation in order to correct for shifting of the image during scanning. The amount of shift may be detected at block 119 in a number of ways such as by repeating the steps performed in the detection of the left margin on the data elements of the right margin. Another approach is to maintain a running count of the greatest number of element positions between the left-most element of a scan line and the rightmost element of the scan line. Such a count will define the longest scan line, which of course may be on a diagonal across the image. Accordingly, this count of the longest scan line will be multiplied by the cosine of the angle of rotation in order to determine the true width of the image on the document. This last approach may not be accurate for circular images, and, for that reason, the first described approach is our preferred embodiment. The left margin may be determined from the point of rotation which is normally chosen to lie on the left margin. In our embodiment the point of rotation has been chosen to be the top left point of image intersection with the best-fit line.

Using the determined left and right margins, the image is shifted so as to maintain a predetermined left margin distance from the edge of the document but not lose any part of the image on the right hand edge. Shifting is accomplished by any of the known methods. In the simplest method, image data at the edge of the image in the direction of shift is moved over in memory in the direction and required amount of shift. Adjacent data is then moved likewise into adjacent locations against the earlier moved data until all of the data has been moved.

Figure 3:
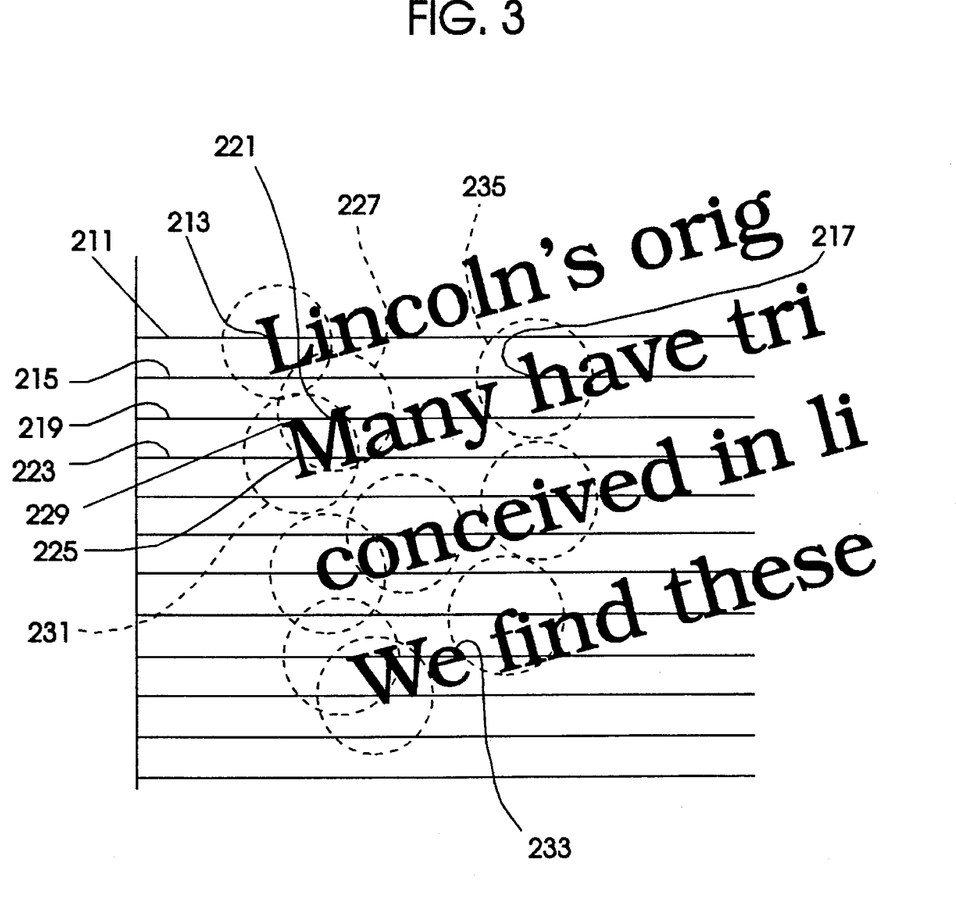
FIG. 3 is a diagram of periodic scans across an image of text showing compensating circular sweeps in an embodiment of the invention.

Referring now to FIG. 3, an image of text is shown overlaid with logical horizontal lines which are in fact the selected scan lines of data provided by scanner 12 and stored in buffer 17. Line 211 is a scan line of data received from scanner 12 and stored in buffer 17 after the first two hundred and fifty scans have been received and stored in buffer memory 17. The left-most non-background pixel occurs at location 213, the memory map coordinates of which are stored in buffer 23. K scans later, line 21 5 is received and processed by pixel selection logic 21 to select the x-coordinate of the left-most image pixel 217 which in this case is far to the right due to interline spacing. After another k scans, line 219 is selected and the coordinates of pixel 221 are stored. Likewise line 223 and pixel location 225 are recorded and so forth for m scan lines until adequate data has been collected to create a line substantially through the left margin.

After selecting the left-most intersecting pixel 221 with line 219, an area 227 is chosen around the coordinates of pixel 221 in which to search for pixels which are still further left. In this case pixel 229 is within search area 227 and is left-most. Accordingly, the coordinates of pixel 229 are substituted for those of 221. Note that on this case, as may sometimes happen, the left-most pixel 229 is also the left-most pixel in the search area circle 231 about pixel 225 which is intersected by line 223. Accordingly the coordinates of pixels 221 and 225 are both improved by the method of the invention to be the coordinates of pixel 229 which is substantially on the left margin. Being recorded twice, it has twice the weight in the subsequent best fit calculations as does, for example, pixel 233 on a subsequent line.

The pixel 217 is far to the right and although a search circle 235 also has been created around it, any left-most pixel in it's search circle is still far to the right. The coordinates of pixel 217 and it's improvement pixel will later be eliminated by the standard deviation calculations.

It will be recognized that the search area need not be limited to a circle when in fact a left semicircle or left rectangle will also yield similar margin point improvement.

Figure 4:
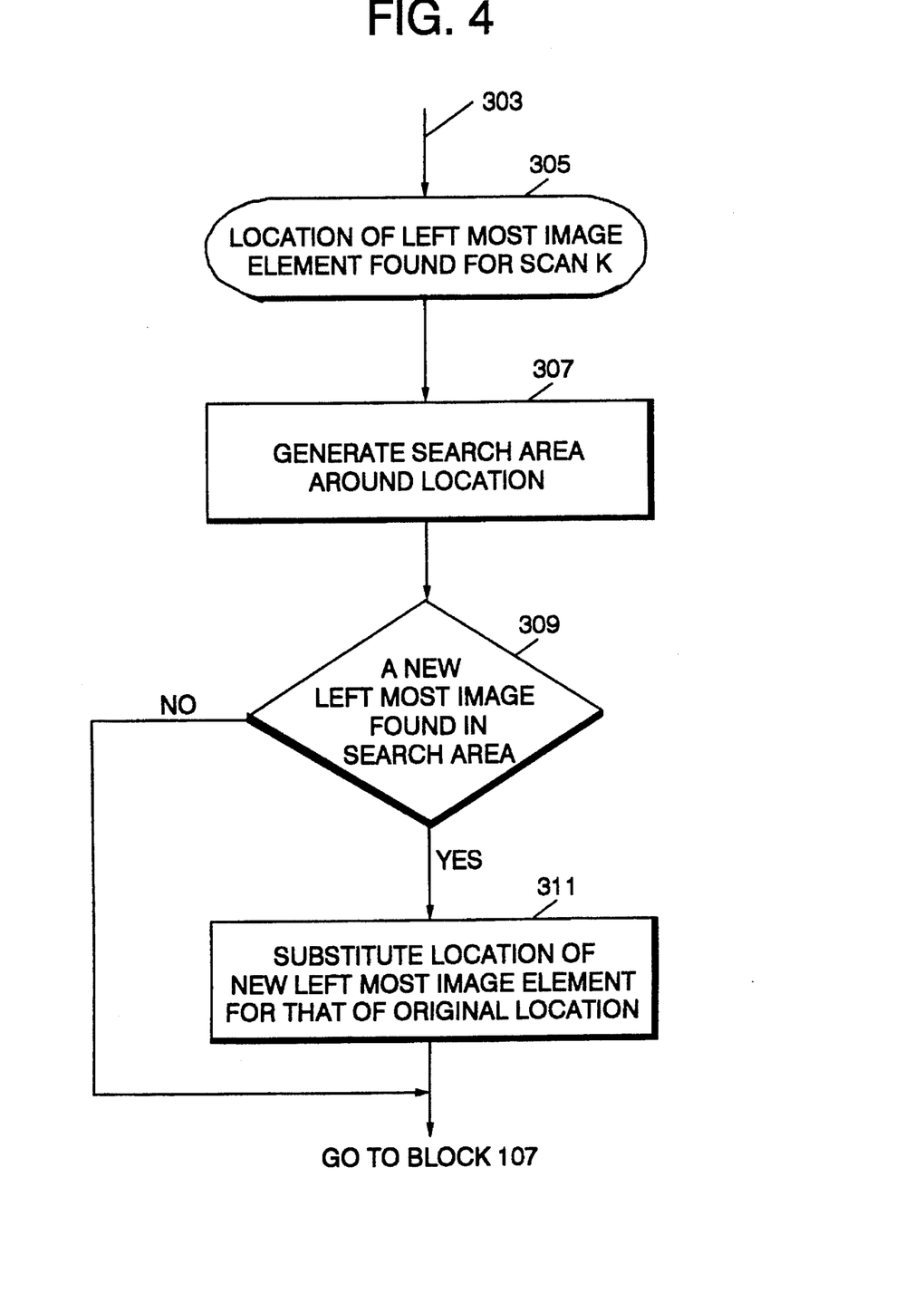
FIG. 4 is a flow diagram showing the method steps of margin point location expansion according to the invention.

We now direct the reader's attention to FIG. 4 wherein a flow diagram of the method of the margin point search expansion is shown. The process starts at block 105 in FIG. 2 where the location of the left-most image element intersecting the kth scan line was found and stored in buffer 23. Instead of proceeding directly to 107, the process of FIG. 4 proceeds at flow line 303 to block 305 where the location found at block 105 is noted. Then the method generates a search area around the location at block 307. At block 309, if a new left-most image element is not found, the method returns to block 107 in FIG. 2. If a new left-most image element is found, then it's location is stored in buffer 23 in place of the original location found at block 105. Thereafter the method returns to FIG. 2 at block 107.

Figure 5:
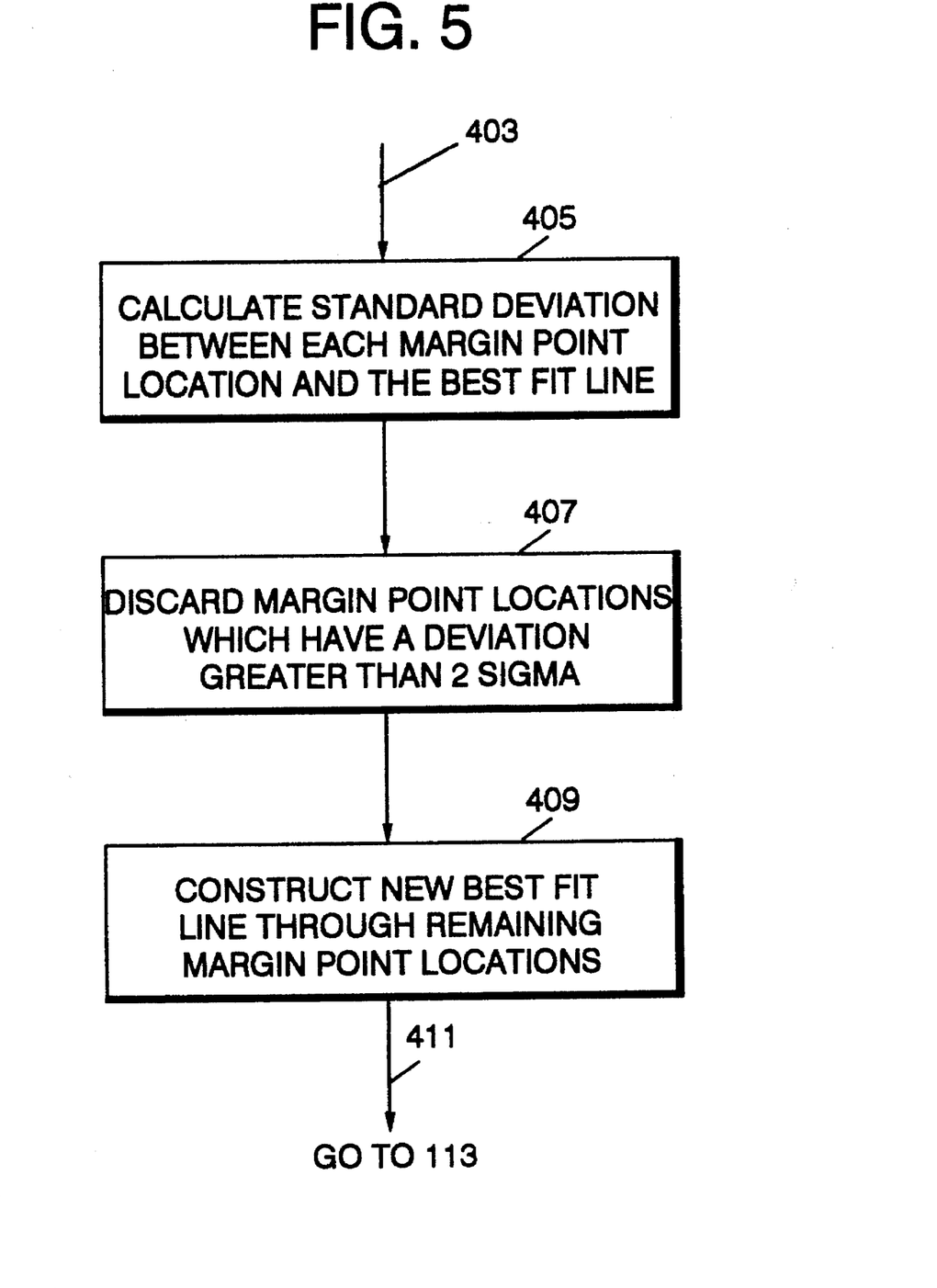
FIG. 5 is a flow diagram showing the method steps of margin point location compensation according to the invention.

Referring now to FIG. 5, the method of compensating for far right location margin points found will be described. The process of compensation starts at block 111 of FIG. 2 and proceeds via flow line 403 to block 405 where the standard deviation between each margin point location and the constructed best-fit line is calculated. At block 407, those margin points having a deviation of 2 sigma or greater such as point 217 in FIG. 3, are discarded from the list of locations representing the left margin. Then the method proceeds to block 409 where a new best-fit line is constructed through the remaining left margin point locations thereby compensating for the far right locations due to image irregularities or inter-line text spacings. The method returns to FIG. 2 at block 113 via flow line 411.

Having described the invention in terms of a preferred embodiment thereof, it will be recognized by those skilled in the art of computer peripheral equipment design that various changes in the structure and programming of the implementations described can be made without departing from the spirit and scope of the invention which is measured by the following claims.

What is claimed is:

1. A computer program for use in a line scanning system, said line scanning system comprising:

a scanner for scanning an image and generating image information representative of said image, said image information having background elements and image elements;

storage connected to said scanner for storing said elements as they are received from said scanner, said storage storing said elements into said memory so as to preserve a record of the location of each of said elements in said image;

a computer connected to said scanner and to said storage and controlled by said computer program, said computer program comprising:

first programmed instructions responsive to said scanner for selecting a left-most image element from each of a plurality of selected horizontal line scans;

second programmed instructions responsive to said first programmed instructions for listing the location in said image of each of said left-most image elements;

third programmed instructions responsive to said second programmed instructions for generating a best-fit line through said listed locations of said left-most image elements;

fourth programmed instructions responsive to said third programmed instructions for changing said record of said locations of said image elements so as to rotate said stored image through an angle which is the difference of the slope of said best-fit line from vertical.

2. The computer program of claim 1 wherein said fourth programmed instructions further comprise:

fifth programmed instructions for choosing a point lying on said best-fit line as a point of relation of said image, the x-coordinate of said point of rotation being the x-coordinate of a point on the left margin; and said computer program further comprising:

sixth programmed instructions responsive to said fourth programmed instructions for changing said record of said locations so as to shift said image to provide a predetermined left margin without losing a portion of said image.

3. The computer program of claim 1 wherein said first programmed instructions are responsive to said scanner having scanned a predetermined upper portion of said image before beginning said selecting of said left-most image element from each of a plurality of subsequent scans.

4. The computer program of claim 1 wherein said fourth programmed instructions implement a three-shear rotation algorithm.

5. The computer program of claim 1 wherein said third programmed instructions further comprise:

deviation calculation programmed instructions for removing from said list of locations, those locations of said left-most image elements that deviate from said best-fit line by more than a predetermined amount;

new best-fit programmed instructions for calculating a new best-fit line through those locations remaining in said list of locations.

6. The computer program of claim 1 wherein said first programmed instructions select said left-most image element from each kth scan of said scans received from said scanner.

7. A computer program for use in a line scanning system, said line scanning system comprising:

a scanner for scanning an image and generating image information in the form of a plurality of horizontal scan lines representative of said image, said image information having background elements and image elements;

storage connected to said scanner for storing said elements as they are received from said scanner, said storage organizing said elements as a map representative of said image;

said computer program comprising:

first programmed instructions responsive to said scanner for selecting horizontal lines of information received during each kth scan;

second programmed instructions responsive to said first programmed instructions for detecting the location on said map of a left-most intersection of each of said kth horizontal scan lines with an image element;

third programmed instructions responsive to the detection of said left-most intersections for logically overlaying each of said intersections with a search area;

fourth programmed instructions responsive to said third programmed instructions for detecting the location on said map of a left-most image element within each of said areas and substituting said detected location as said left-most image element;

fifth programmed instructions responsive to said fourth programmed instructions for generating a best-fit line through said locations on said map of said left-most image elements;

sixth programmed instructions responsive to said fifth programmed instructions for calculating an angle between said best-fit line and a vertical line;

seventh programmed instructions responsive to said sixth programmed instructions for rotating said map through said angle.

8. The computer program of claim 7 further comprising:

eighth programmed instructions responsive to said seventh programmed instructions for logically overlaying said rotated map with horizontal lines;

ninth programmed instructions responsive to said eighth programmed instructions for detecting the location on said map of a right-most intersection of each of said lines with an image element;

tenth programmed instructions responsive to said ninth programmed instructions for determining the left margin and the right margin from said left-most intersections and said right-most intersections respectively;

eleventh programmed instructions responsive to said tenth programmed instructions for shifting said map.

9. The computer program of claim 7 wherein said first programmed instructions are responsive to said scanner having scanned a predetermined upper portion of said image and beginning said horizontal line selection after said portion.

10. The computer program of claim 7 wherein said fourth programmed instructions implement a shear rotation algorithm.

11. The computer program of claim 7 wherein said fifth programmed instructions further comprise:

deviation calculation programmed instructions for calculating a standard deviation of each of said locations of said left-most image elements from said best-fit line;

new best-fit programmed instructions responsive to said deviation calculation programmed instructions for calculating a new best-fit line through only those locations that have a standard deviation less than a predetermined value.

12. The method of correcting for skew in a line scanning system comprising the steps of:

receiving image information from a scanner which scans a field and generates said image information in the form of a plurality of horizontal scan lines representative of an image, said image information having background elements and image elements;

storing said elements as they are received from said scanner, said storage organizing said elements as a map representative of said image;

selecting from said image information received from said scanner, horizontal lines of information received during each kth scan;

listing the location in said image of a left-most image element of each of said kth horizontal scan lines;

generating a best-fit line through said listed locations in said image of said left-most image elements;

calculating an angle between said best-fit line and a line perpendicular to said kth horizontal scan lines; and rotating said map through said angle.

13. The method of claim 12 wherein said step of selecting is responsive to said scanner having scanned a predetermined upper portion of said image before beginning said selecting of said left-most image element from each of said kth scans.

14. The method of claim 12 wherein said step of generating a best-fit line further comprises the steps of:

removing from said list of locations, those locations of said left-most image elements that deviate from said best-fit line by more than a predetermined amount;

calculating a new best-fit line through those locations remaining in said list of locations.

15. The method of claim 12 wherein said rotating step performs a shear rotation algorithm.

16. The method of correcting for skew in a line scanning system comprising the steps of:

receiving image information from a scanner which scans a field and generates said image information in the form of a plurality of horizontal scan lines representative of an image, said image information having background elements and image elements;

storing said elements as they are received from said scanner, said storage organizing said elements as a map representative of said image;

selecting from said image information received from said scanner, horizontal lines of information received during each kth scan;

detecting the location on said map of a left-most intersection of each of said kth horizontal scan lines with an image element;

generating a best-fit line through said locations on said map of said left-most image elements;

calculating a standard deviation of each of said locations of said left-most image elements from said best-fit line;

calculating a new best-fit line through only those locations that have a standard deviation less than a predetermined value;

calculating an angle between said best-fit line and a line perpendicular to said horizontal lines;

rotating said map through said angle.

17. The method of claim 16 further comprising the steps of:

logically overlaying said rotated map with horizontal lines;

detecting the location on said rotated map of a right-most intersection of each of said lines with an image element;

determining the left margin and the right margin from said left-most intersections and said right-most intersections respectively;

shifting said map so as to provide for a predetermined left margin without losing a portion of said image.

18. The method of claim 16 wherein said step of detecting the location of said left-most intersections further comprises the steps of:

logically overlaying each of said intersections with a search area;

detecting the location on said map of a left-most image element within each of said areas and substituting said detected location as said left-most image element.

19. The method of claim 16 wherein said step of rotation performs a shear rotation algorithm.

20. In a line scanning system, the combination comprising:

a scanner for scanning an image and generating image information in the form of a plurality of horizontal scan lines representative of said image, said image information having background elements and image elements;

storage connected to said scanner for storing said elements as they are received from said scanner, said storage organizing said elements as a map representative of said image;

first programmed instructions responsive to said scanner for selecting horizontal lines of information received during each kth scan;

second programmed instructions responsive to said first programmed instructions for detecting the location on said map of a left-most intersection of each of said kth horizontal scan lines with an image element;

third programmed instructions responsive to said second programmed instructions for generating a best-fit line through said locations on said map of said left-most image elements;

fourth programmed instructions responsive to said third programmed instructions for calculating a standard deviation of each of said locations of said left-most image elements from said best-fit line;

fifth programmed instructions responsive to said fourth programmed instructions for calculating a new best-fit line through only those locations that have a standard deviation less than a predetermined value;

sixth programmed instructions responsive to said fifth programmed instructions for calculating an angle between said best-fit line and a line perpendicular to said horizontal lines;

seventh programmed instructions responsive to said sixth programmed instructions for rotating said map through said angle.

21. The line scanning system of claim 20 wherein said second programmed instructions further comprise:

expansion programmed instructions responsive to the detection of said left-most intersections for logically overlaying each of said intersections with a search area;

search programmed instructions responsive to said expansion programmed instructions for detecting the location on said map of a left-most image element within each of said areas and substituting said detected location as said left-most image element.

22. The line scanning system of claim 20 further comprising:

eighth programmed instructions responsive to said seventh programmed instructions for logically overlaying said rotated map with horizontal lines;

ninth programmed instructions responsive to said eighth programmed instructions for detecting the location on said map of a right-most intersection of each of said lines with an image element;

tenth programmed instructions responsive to said ninth programmed instructions for determining the left margin and the right margin from said left-most intersections and said right-most intersections respectively;

eleventh programmed instructions responsive to said tenth programmed instructions for shifting said map.

* * * * *